United States Patent [19]
Rekai

[11] 3,828,332
[45] Aug. 6, 1974

[54] TEMPERATURE RESPONSIVE CIRCUIT HAVING A HIGH FREQUENCY OUTPUT SIGNAL

[75] Inventor: Andre Rekai, Scarborough, Ontario, Canada

[73] Assignee: Honeywell Inc., Minneapolis, Minn.

[22] Filed: June 19, 1972

[21] Appl. No.: 263,805

[52] U.S. Cl............... 340/227 R, 236/94, 219/511, 317/132, 73/362 AR
[51] Int. Cl...................... G08b 21/00, G05d 23/00
[58] Field of Search...... 340/227, 228, 234; 236/94, 236/68 B; 244/134 F; 73/362 R, 362 AS, 362 AR; 317/132; 321/16, 37; 219/511; 235/92 MT; 332/4; 331/66; 337/96, 112

[56] References Cited
UNITED STATES PATENTS

| | | | |
|---|---|---|---|
| 3,142,170 | 7/1964 | Calhoun | 73/362 AR X |
| 3,308,667 | 3/1967 | Pearlman | 73/362 AR |
| 3,475,742 | 10/1969 | Whitney et al. | 73/362 R X |
| 3,517,900 | 6/1970 | Roussel | 340/234 UX |
| 3,523,182 | 8/1970 | Phillips et al. | 331/66 X |
| 3,540,025 | 11/1970 | Levin et al. | 340/234 |

Primary Examiner—John W. Caldwell
Assistant Examiner—William M. Wannisky
Attorney, Agent, or Firm—Lamont B. Koontz; Clyde C. Blinn

[57] ABSTRACT

A temperature sensing switching circuit producing a high frequency output signal indicative of the ambient temperature of a temperature responsive resistance element, having a large change in resistance over a small change in temperature. The switching circuit controls a feedback heater for artifically heating the resistance element to produce the small change in temperature to reverse the operation of the switching circuit. The repeated switching of said switching circuit provides an output signal which has a frequency indicative of the ambient temperature.

2 Claims, 3 Drawing Figures

TEMPERATURE RESPONSIVE CIRCUIT HAVING A HIGH FREQUENCY OUTPUT SIGNAL

BACKGROUND AND SUMMARY OF THE INVENTION

Temperature indicators having temperature responsive switching apparatus for providing a pulsing output have been used for some time for providing a remote temperature indication as shown in the Edward S. Mayo U.S. Pat. No. 2,089,613, for resetting temperature control systems as shown in the Edwin K. Stodola U.S. Pat. No. 3,061,197, for providing pulsating outputs indicative of the temperature for temperature control as shown in the R. P. Burleigh Jr. U.S. Pat. No. 2,488,580 and for use in an electronic thermostat as shown in the George D. Hanchett, Jr. U.S. Pat. No. 2,511,981.

Using recently developed thin film polyconductors which provide a relatively large change in resistance for a small change in temperature and have a high speed of thermal response both during the heating and the cooling periods, the applicant provides a new and novel switching circuit providing a high frequency pulsating output signal. Specifically a temperature sensing circuit makes use of a temperature responsive resistance element providing a switching operation for an output signal with a heater controlled by the output and thermally associated with the element providing a thermal feedback. With the feedback, the temperature responsive element is driven through a small range of temperature change reversing the switching operation. As the element is heated and cooled, a high frequency pulsating output signal results which is indicative of the temperature to which the element is exposed.

FIG. 1 of the drawing is a block diagram of the circuit having the temperature responsive element and switching circuit panel to provide the output to a meter.

DESCRIPTION OF THE PRESENT INVENTION

Figure 1:
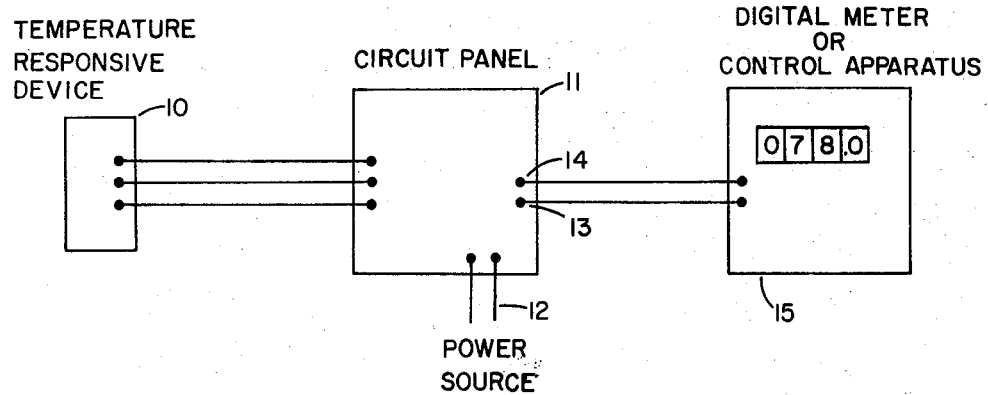

Referring to FIG. 1, a condition or temperature responsive device 10 is connected to a switching circuit panel 11 having a power source 12 to provide an output at terminals 13 and 14 which are adapted to be connected to a high frequency pulsating output signal responsive device or frequency to digital meter or control apparatus 15.

Figure 2:
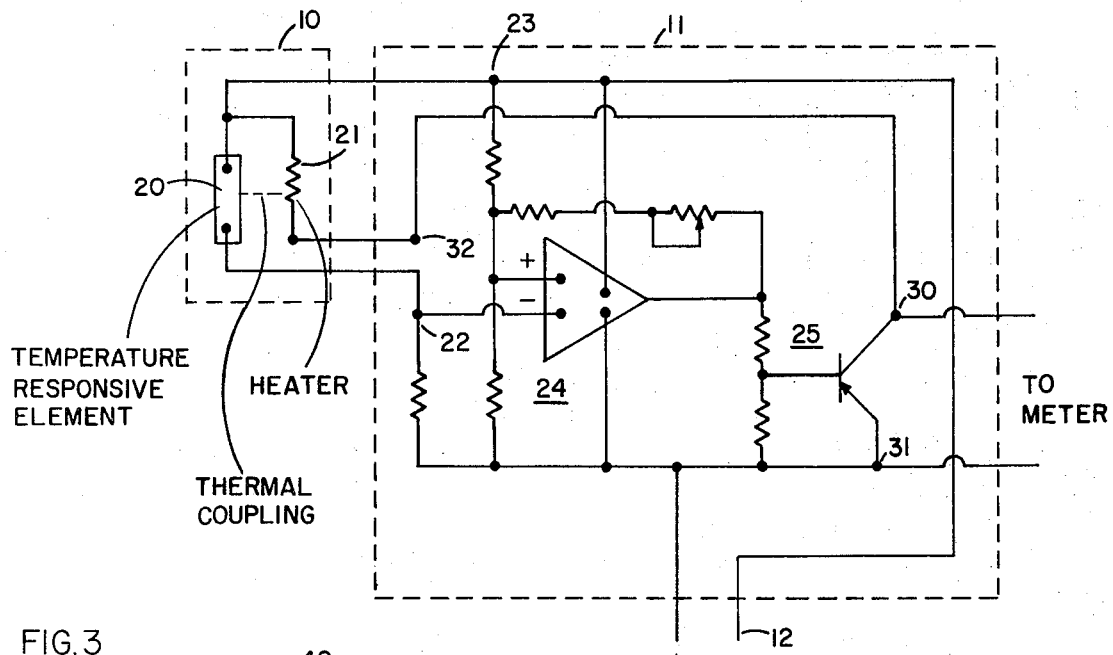
FIG. 2 is a detailed schematic of the circuit contained in two of the blocks of FIG. 1 showing the temperature responsive element with the thermally coupled heater to provide the feedback signal when the switching circuit of the panel operates to provide the pulsating output to the meter.

Device 10 as shown in FIG. 2 comprises a condition or temperature responsive impedance means or resistance element 20 associated with a feedback means or heater 21 thermally coupled to element 20. Specifically, device 10 is a polyconductor of the type made by Superior Electronics Industries Ltd. of Montreal, Quebec comprising a thin film type resistance element 20 having a large change in resistance over a relatively small change in temperature with a thin coating of resistance material to form heater 21. The time-constant of heat dissipation of device 10 is extremely fast whereby the heating and cooling rate is high. The speed of thermal response between heater 21 and element 20 is extremely fast due to the small mass of the thin film design.

Resistance element 20 is connected to the input terminal 22 and 23 of panel 11 containing an amplifier circuit 24 and a switching circuit 25 for providing an output signal at output terminals 30 and 31. Switching circuit 25 also controls the energization of feedback heater 21 connected to terminal 32.

OPERATION OF THE INVENTION

Assuming that the ambient temperature surrounding device 10 is 70°F, the resistance of element 20 is a predetermined value. The resistance input to amplifier 25 causes switching circuit 25 to be conductive to energize heater 21. At the same time, the output signal available at output terminals 30 and 31 is substantially 0. Upon element 20 rapidly increasing in temperature, switching device 25 becomes nonconductive to deenergize heater 21 and provide an output at terminals 30 and 31. As device 10 is fast to cool, a recycling of the operation takes place depending upon the ambient temperature to provide a pulsating output from panel 11 which has a high frequency (such as 1,000Hz) indicative of the ambient temperature (such as 78°F). Device 15 is responsive to the pulsating output whereby indication and/or control can be accomplished.

Figure 3:
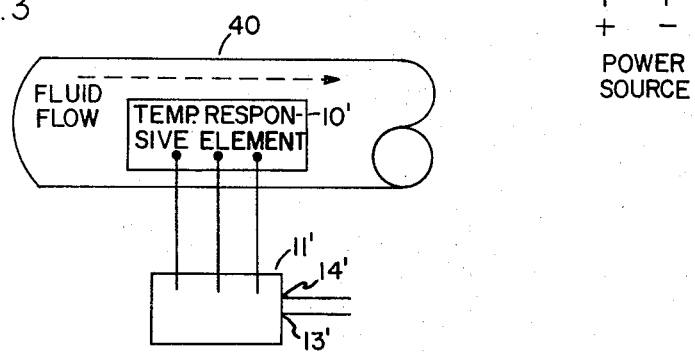
FIG. 3 is another embodiment of the present invention wherein the temperature responsive element is placed in a fluid flow to provide an output indicative of flow measurement.

Another embodiment of the present invention is shown in FIG. 3 wherein a constant temperature fluid flows through a conduit 40 and a temperature responsive device 10' similar to that shown in FIGS. 1 and 2 is placed in the fluid flow to provide an output from the panel 11' indicative of fluid flow. Obviously such a use of the present invention could necessitate temperature compensation of the type shown in the Yehrman et al. U.S. Pat. No. 3,085,431 if the temperature of the fluid in conduit 20 varied.

The embodiments of the invention in which an exclusive property or right is claimed are defined as follows:

1. A temperature sensing circuit for producing a high frequency output signal, the frequency of which is indicative of the level of the ambient temperature comprising:

a temperature sensitive circuit impedance element responsive to an ambient temperature and having a large change in impedance over a predetermined small change in temperature of said element, said element being a thin resistance film thus having a relatively small mass, switching circuit means for providing an output signal when said switching circuit switches back and forth between one state and a second state of operation, circuit means connecting said impedance element to said switching circuit means whereby a predetermined level of temperature of said impedance element causes said switching circuit means to be in said one state, a feedback heating element associated with said temperature impedance element for artificially changing the said predetermined level of said temperature of said impedance element, said heating element being a thin coating on said thin resistance film, said coating having a small mass, means connecting said feedback element to said switching circuit to energize said feedback element when said switching circuit is in said one state whereby the level of said temperature of said sensitive element changes by said small change from said predetermined level of said temperature to produce said large change in impedance to operate said switching circuit means from said one state to said second state to deenergize said feedback heating element thereby by a repetition of the operation providing a pulsing signal having a frequency indicative of the ambient temperature.

2. The invention of claim 1 wherein said pulsing output signal is a high frequency signal of at least 1,000 Hz for an ambient temperature of 78°F to which said element is exposed.

* * * * *